US010605116B2

(12) United States Patent
Futahashi et al.

(10) Patent No.: US 10,605,116 B2
(45) Date of Patent: Mar. 31, 2020

(54) HYDRAULIC DRIVING DEVICE FOR STEAM VALVE, COMBINED STEAM VALVE, AND STEAM TURBINE

(71) Applicant: MITSUBISHI HITACHI POWER SYSTEMS, LTD., Kanagawa (JP)

(72) Inventors: Kensuke Futahashi, Tokyo (JP); Katsuhisa Hamada, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 499 days.

(21) Appl. No.: 15/506,042

(22) PCT Filed: Nov. 24, 2015

(86) PCT No.: PCT/JP2015/082917
§ 371 (c)(1),
(2) Date: Feb. 23, 2017

(87) PCT Pub. No.: WO2016/084793
PCT Pub. Date: Jun. 2, 2016

(65) Prior Publication Data
US 2018/0216486 A1 Aug. 2, 2018

(30) Foreign Application Priority Data
Nov. 26, 2014 (JP) ................. 2014-238523

(51) Int. Cl.
*F01D 17/14* (2006.01)
*F16K 1/44* (2006.01)
(Continued)

(52) U.S. Cl.
CPC .......... *F01D 17/146* (2013.01); *F01D 17/10* (2013.01); *F01D 17/145* (2013.01);
(Continued)

(58) Field of Classification Search
CPC .... F15B 11/046; F15B 15/227; F01D 17/146; F01D 17/145; F01D 17/10; F16K 1/443
See application file for complete search history.

(56) References Cited

U.S. PATENT DOCUMENTS 4,589,444 A * 5/1986 Masek et al. ......... F01D 17/145
137/613
5,573,366 A 11/1996 Meijer
(Continued)

FOREIGN PATENT DOCUMENTS

CN 201991879 9/2011
CN 102996563 3/2013
(Continued)

OTHER PUBLICATIONS

International Search Report dated Feb. 23, 2016 in International (PCT) Application No. PCT/JP2015/082917.
(Continued)

*Primary Examiner* — Kevin L Lee
(74) *Attorney, Agent, or Firm* — Wenderoth, Lind & Ponack, L.L.P.

(57) ABSTRACT

A hydraulic driving device for a steam valve includes a plurality of hydraulic actuators to generate driving force to be transmitted to the valve body through a valve shaft of the steam valve. The hydraulic actuators each include a cylinder, a piston that is capable of reciprocating in the cylinder, and a rod having respective ends connected to the piston and valve shaft. The hydraulic actuators include a main actuator including a throttle portion for regulating a flow of pressure oil in a hydraulic chamber defined by the cylinder and piston so that a damping force is applied to the valve body during its closing operation. The one or more hydraulic actuators other than the main actuator include at least one sub actuator not having the throttle portion. The hydraulic chamber of the
(Continued)

sub actuator communicates with the hydraulic chamber of the main actuator.

10 Claims, 6 Drawing Sheets

(51) Int. Cl.
*F01D 17/10* (2006.01)
*F16K 31/122* (2006.01)
*F15B 11/046* (2006.01)
*F15B 15/22* (2006.01)

(52) U.S. Cl.
CPC .......... *F15B 11/046* (2013.01); *F15B 15/227* (2013.01); *F16K 1/443* (2013.01); *F16K 31/1225* (2013.01); *F05D 2220/31* (2013.01); *F16K 31/1221* (2013.01)

(56) References Cited

U.S. PATENT DOCUMENTS

| | | | |
|---|---|---|---|
| 7,356,990 | B2 | 4/2008 | Burdick et al. |
| 9,938,851 | B2* | 4/2018 | Okamura ................. F01K 5/02 |
| 9,982,558 | B2* | 5/2018 | Katagake ................ F01D 17/18 |
| 2015/0322812 | A1 | 11/2015 | Futahashi et al. |

FOREIGN PATENT DOCUMENTS

| | | |
|---|---|---|
| CN | 202789850 | 3/2013 |
| JP | 57-199792 | 12/1982 |
| JP | 08-170503 | 7/1996 |
| JP | 09-280006 | 10/1997 |
| JP | 2002-097903 | 4/2002 |
| JP | 2010-180973 | 8/2010 |
| WO | 2014/098073 | 6/2014 |

OTHER PUBLICATIONS

Office Action dated Nov. 1, 2017 in Chinese Application No. 201580050581.2, with English translation.
The Decision of Refusal dated Feb. 9, 2018 in corresponding Japanese Application No. 2014-238523 with Machine Translation.
Japan Office Action dated Aug. 4, 2017 in corresponding Japanese Patent Application No. 2014-238523 with Machine translation.
International Preliminary Report on Patentability and Written Opinion of the International Searching Authority dated Jun. 8, 2017 in International (PCT) Application No. PCT/JP2015/082917 with English translation.
Office Action dated Jul. 2, 2018 in corresponding Korean Application No. 10-2017-7003636 with Machine Translation.
The Examination Report dated Apr. 26, 2019 in corresponding Indian Application No. 201717009203 with English translation.

* cited by examiner

HYDRAULIC DRIVING DEVICE FOR STEAM VALVE, COMBINED STEAM VALVE, AND STEAM TURBINE

TECHNICAL FIELD

The present disclosure relates to a hydraulic driving device for a steam valve, a combined steam valve, and a steam turbine.

BACKGROUND

A hydraulic driving device may be used in a steam turbine for driving a steam valve (for example, a stop valve, a regulating valve, or the like) used for shutting off a steam flow and controlling a steam flowrate.

For example, Patent Document 1 discloses a steam valve including a stop valve driven by a valve driving mechanism using a hydraulic cylinder. In the steam valve, output shafts of a plurality of hydraulic cylinders are connected to a valve shaft of a stop valve via a connection member. The valve shaft, with which a valve body of the stop valve is operated, is driven by the plurality of hydraulic cylinders via the connection members. A plurality of hydraulic cylinder mechanisms are synchronously driven under control performed by a control device.

CITATION LIST

Patent Literature

Patent Document 1: WO 2014/098073

SUMMARY

Technical Problem

The steam valve described in Patent Document 1 may be provided with a damper mechanism, for each of a plurality of hydraulic cylinders, for applying damping force to the piston and the valve body so that these members gently stop to achieve lower impact due to collision between the valve body and a valve seat when the valve is closed.

Unfortunately, the hydraulic cylinder provided with the damper mechanism has a complex structure. Furthermore, a system for synchronized control is further required for achieving uniform damping force applied to the valve body in a plurality of hydraulic cylinders. This may lead to an even more complex structure of the hydraulic driving device.

Thus, uniform damping force applied to the valve body in the plurality of hydraulic cylinders is desired to be achieved with a simple structure.

In view of the above, an object of at least one embodiment of the present invention is to provide a hydraulic driving device for a steam valve that can achieve uniform damping force to a valve body when a valve is opened, with a simple structure.

Solution to Problem (1) A hydraulic driving device for a steam valve for driving a valve body of the steam valve according to at least one embodiment of the present invention includes:

a plurality of hydraulic actuators to generate driving force to be transmitted to the valve body through a valve shaft of the steam valve, wherein the plurality of hydraulic actuators each include:
a cylinder;
a piston which is configured to be capable of reciprocating in the cylinder; and
a rod having one end connected to the piston and another end connected to the valve shaft, the plurality of hydraulic actuators include a main actuator including a throttle portion for regulating a flow of pressure oil in a hydraulic chamber defined by the cylinder and the piston so that a damping force is applied to the valve body during a closing operation of the valve body, the one or more hydraulic actuators other than the main actuator include at least one sub actuator not having the throttle portion provided, and the hydraulic chamber of the sub actuator is in communication with the hydraulic chamber of the main actuator.

In the configuration described in (1), the throttle portion for applying a damping force to the valve body during the closing operation is disposed only in the main actuator among the plurality of hydraulic actuators, and the hydraulic chamber of the sub actuator is in communication with the hydraulic chamber of the main actuator. In this case, the throttle portion is disposed in the hydraulic chamber of the main actuator. Thus, the pressure in the hydraulic chamber of the main actuator rises as the piston moves in the closing operation. Accordingly, the pressure also rises in the hydraulic chamber of the sub actuator communicating with the hydraulic chamber of the main actuator. In this manner, the closing operation involves a pressure rise in the hydraulic chamber of all of the hydraulic actuators. Thus, the damping force can be applied to the valve body during the closing operation. All things considered, the hydraulic driving device can have a simple structure with the throttle portion disposed in the hydraulic chamber of the main actuator providing the damper function to the hydraulic chamber of all the hydraulic actuators.

Since the hydraulic chamber of the sub actuator is communicating with the hydraulic chamber of the main actuator, the hydraulic chambers have the same pressure in a normal state. Thus, a uniform damping force can be provided in the plurality of hydraulic actuators, and the damping force can be applied to a single stop valve body.

(2) In some embodiments, in the configuration (1) described above, the hydraulic chamber of the main actuator includes:
a first chamber facing the piston; and
a second chamber which is in communication with the first chamber via the throttle portion and which is connected to an external hydraulic circuit including an oil tank, and the hydraulic chamber of the at least one sub actuator is in communication with the first chamber of the hydraulic chamber of the main actuator.

In the configuration described in (2), in the main actuator, the flow of the hydraulic oil from the first chamber to the second chamber is throttled, in the closing operation of the valve body, by the throttle portion between the first chamber and the second chamber. Thus, the pressure rises in the first chamber, whereby the damping force is applied to the valve body. The hydraulic chamber of the sub actuator communicates with the first chamber of the main actuator. Thus, in the closing operation, the pressure rise in the first chamber of the main actuator entails the pressure rise in the hydraulic chamber of the sub actuator. Thus, the throttle portion provided to the hydraulic chamber of the main actuator can achieve a uniform damping force on the plurality of hydraulic actuators, and the damping force can be applied to a single valve body.

(3) In some embodiments, the configuration (1) or (2) described above further includes at least one communication pipe which respectively connects the hydraulic chamber of the at least one sub actuator to the hydraulic chamber of the main actuator.

In the configuration described in (3), with the hydraulic chamber of each of the sub actuators and the hydraulic chamber of the main actuator directly connected to each other via the communication pipe, the pressure in each sub actuator immediately changes in accordance with the pressure change in the hydraulic chamber of the main actuator. Thus, the throttle portion, provided to the hydraulic chamber of the main actuator, achieves a uniform damping force in the plurality of hydraulic actuators, and the damping force can be applied to a single valve body.

(4) In some embodiments, in the configuration (1) or (2) described above, the at least one sub actuator includes two or more sub actuators, and the hydraulic chambers of the two or more sub actuators are connected in series with the hydraulic chamber of the main actuator.

In the configuration described in (4), with the hydraulic chambers of the plurality of sub actuators connected in series with the hydraulic chamber of the main actuator, the hydraulic actuators close to each other can be connected with each other. Thus, the hydraulic driving device be easily installed and built.

(5) In some embodiments, any one of the configurations (1) to (4) described above, further includes:

at least one communication pipe connecting the hydraulic chambers of the plurality of hydraulic actuators to one another; and a discharge pipe through which pressure oil in the hydraulic chamber of the main actuator is to be discharged to the oil tank.

The discharge pipe has a larger diameter than the communication pipe.

In the configuration described in (5), the discharge pipe is disposed in the main actuator, the pressure oil can be discharged to the oil pressure tank through the discharge pipe from the hydraulic chamber of the main actuator and the hydraulic chamber of the sub actuator communicating with the hydraulic chamber of the main actuator.

When the diameter of the discharge pipe is equal to or smaller than the diameter of the communication pipe, a sufficient flowrate of the pressure oil in the discharge pipe cannot be guaranteed and the discharge of the pressure oil can be disrupted while the valve body is closed, and thus quick valve closing might be unachievable. In this regard, in the configuration described in (5), since the discharge pipe has a larger diameter than the communication pipe, the pressure oil in the hydraulic chambers of the hydraulic actuators can be smoothly discharged through the discharge pipe, whereby the valve body can be quickly moved in the valve close direction.

(6) In some embodiments, any one of the configurations (1) to (5) described above, further includes a pressure oil source configured to supply pressure oil to the hydraulic chamber of the main actuator so that an oil pressure in a valve open direction is applied to the piston.

The piston of the at least one sub actuator is configured to receive the pressure oil from the pressure oil source via the hydraulic chamber of the main actuator.

In the configuration described in (6), the pressure oil is also supplied to the hydraulic chamber of the sub actuator through the hydraulic chamber of the main actuator by the pressure oil source configured to supply the pressure oil to the hydraulic chamber of the main actuator. Thus, the hydraulic driving device can have a simple structure with all the hydraulic actuators sharing a single pressure oil source.

(7) A combined steam valve according to at least one embodiment of the present invention includes:

a valve chamber;

a regulating valve provided in the valve chamber; and a stop valve provided in the valve chamber, wherein the stop valve is configured to be driven by the hydraulic driving device according to any one of the configurations (1) to (6) described above.

In the configuration described in (7), the throttle portion for applying a damping force to the valve body during the closing operation is disposed only in the main actuator among the plurality of hydraulic actuators, and the hydraulic chamber of the sub actuator is in communication with the hydraulic chamber of the main actuator. In this case, the throttle portion is disposed in the hydraulic chamber of the main actuator. Thus, the pressure in the hydraulic chamber of the main actuator rises as the piston moves in the closing operation. Accordingly, the pressure also rises in the hydraulic chamber of the sub actuator communicating with the hydraulic chamber of the main actuator. In this manner, the closing operation involves a pressure rise in the hydraulic chamber of all of the hydraulic actuators. Thus, the damping force can be applied to the valve body during the closing operation. All things considered, the hydraulic driving device can have a simple structure with the throttle portion disposed in the hydraulic chamber of the main actuator providing the damper function to the hydraulic chamber of all the hydraulic actuators.

Since the hydraulic chamber of the sub actuator is communicating with the hydraulic chamber of the main actuator, the hydraulic chambers have the same pressure in a normal state. Thus, a uniform damping force can be provided in the plurality of hydraulic actuators, and the damping force can be applied to a single stop valve body.

(8) A steam turbine according to one embodiment of the present invention includes the combined steam valve with the configuration (7) described above.

In the configuration described in (8), the throttle portion for applying a damping force to the valve body during the closing operation is disposed only in the main actuator among the plurality of hydraulic actuators, and the hydraulic chamber of the sub actuator is in communication with the hydraulic chamber of the main actuator. In this case, the throttle portion is disposed in the hydraulic chamber of the main actuator. Thus, the pressure in the hydraulic chamber of the main actuator rises as the piston moves in the closing operation. Accordingly, the pressure also rises in the hydraulic chamber of the sub actuator communicating with the hydraulic chamber of the main actuator. In this manner, the closing operation involves a pressure rise in the hydraulic chamber of all of the hydraulic actuators. Thus, the damping force can be applied to the valve body during the closing operation. All things considered, the hydraulic driving device can have a simple structure with the throttle portion disposed in the hydraulic chamber of the main actuator providing the damper function to the hydraulic chamber of all the hydraulic actuators.

Since the hydraulic chamber of the sub actuator is communicating with the hydraulic chamber of the main actuator, the hydraulic chambers have the same pressure in a normal state. Thus, a uniform damping force can be provided in the plurality of hydraulic actuators, and the damping force can be applied to a single stop valve body.

Advantageous Effects

At least one embodiment of the present invention provides a hydraulic driving device for a steam valve that can achieve uniform damping force to a valve body when a valve is opened, with a simple structure.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
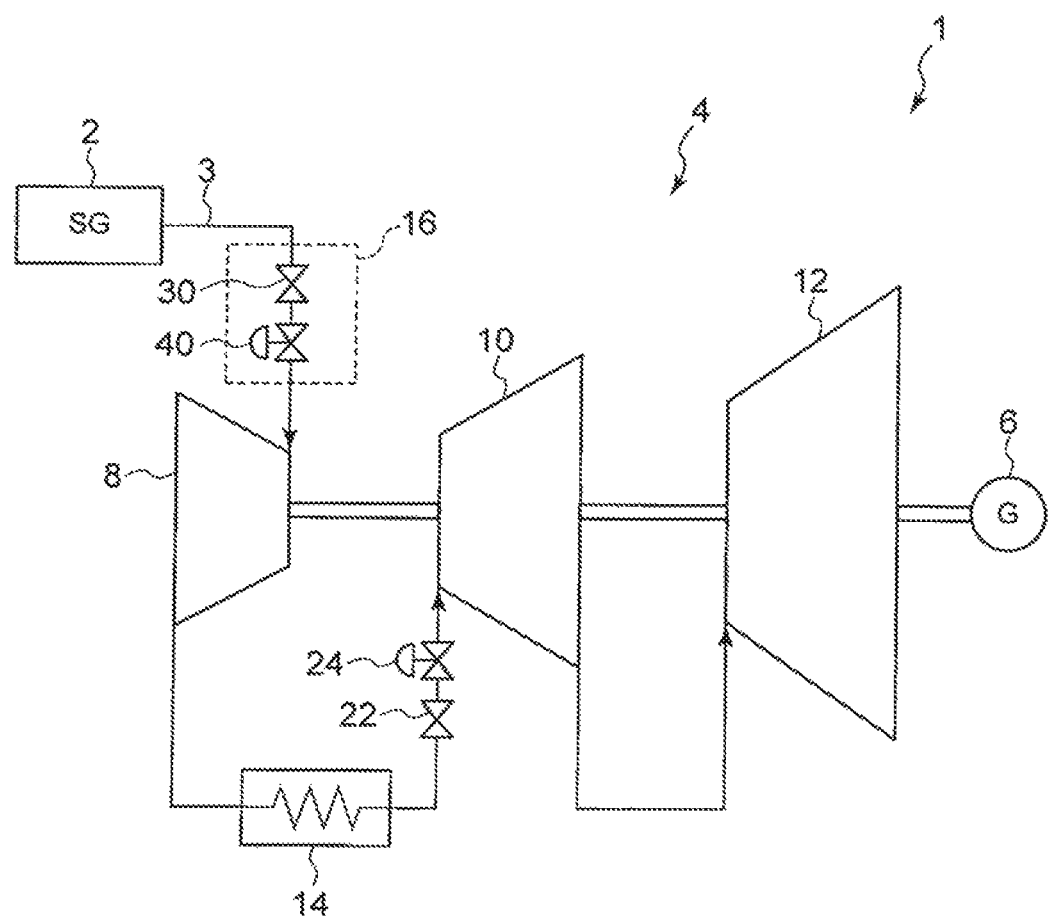
FIG. 1 is a schematic system diagram of a power generating system provided with a steam turbine including a steam valve to which a hydraulic driving device according to one embodiment is applied.

First of all, a power generating system employing a hydraulic driving device according to one embodiment is described. FIG. 1 is a schematic system diagram illustrating a power generating system including a steam turbine including a steam valve employing a hydraulic driving device according to one embodiment.

As illustrated in FIG. 1, the power generating system 1 includes: a boiler 2 for generating steam; a steam turbine 4 for converting pressure of the steam from the boiler 2 into rotational energy; and a generator 6 driven by rotation of the steam turbine 4.

The steam turbine 4 includes a high pressure steam turbine 8, a medium pressure steam turbine 10, and a low pressure steam turbine 12. A reheater 14 is disposed between the high pressure steam turbine 8 and the medium pressure steam turbine 10. The steam discharged from the high pressure steam turbine 8 is reheated by the reheater 14, and then is supplied to the medium pressure steam turbine 10. The steam discharged from the medium pressure steam turbine 10 is supplied to the low pressure steam turbine 12.

The boiler 2 and the high pressure steam turbine 8 are connected to each other via main steam supply piping 3. The main steam supply piping 3 is provided with a steam valve 16 including a stop valve 30 and a regulating valve 40. The flow of steam supplied from the boiler 2 to the high pressure steam turbine 8 can be shut off, by closing the stop valve 30. The flowrate of the steam supplied from the boiler 2 to the high pressure steam turbine 8 can be adjusted by adjusting the opening of the regulating valve 40.

Piping establishing connection between the reheater 14 and the medium pressure steam turbine 10 is provided with a stop valve 22 and a regulating valve 24. With the stop valve 22 and the regulating valve 24, the flow of the steam supplied to the medium pressure steam turbine 10 can be shut off, and the flowrate of the steam can be adjusted.

Figure 2:
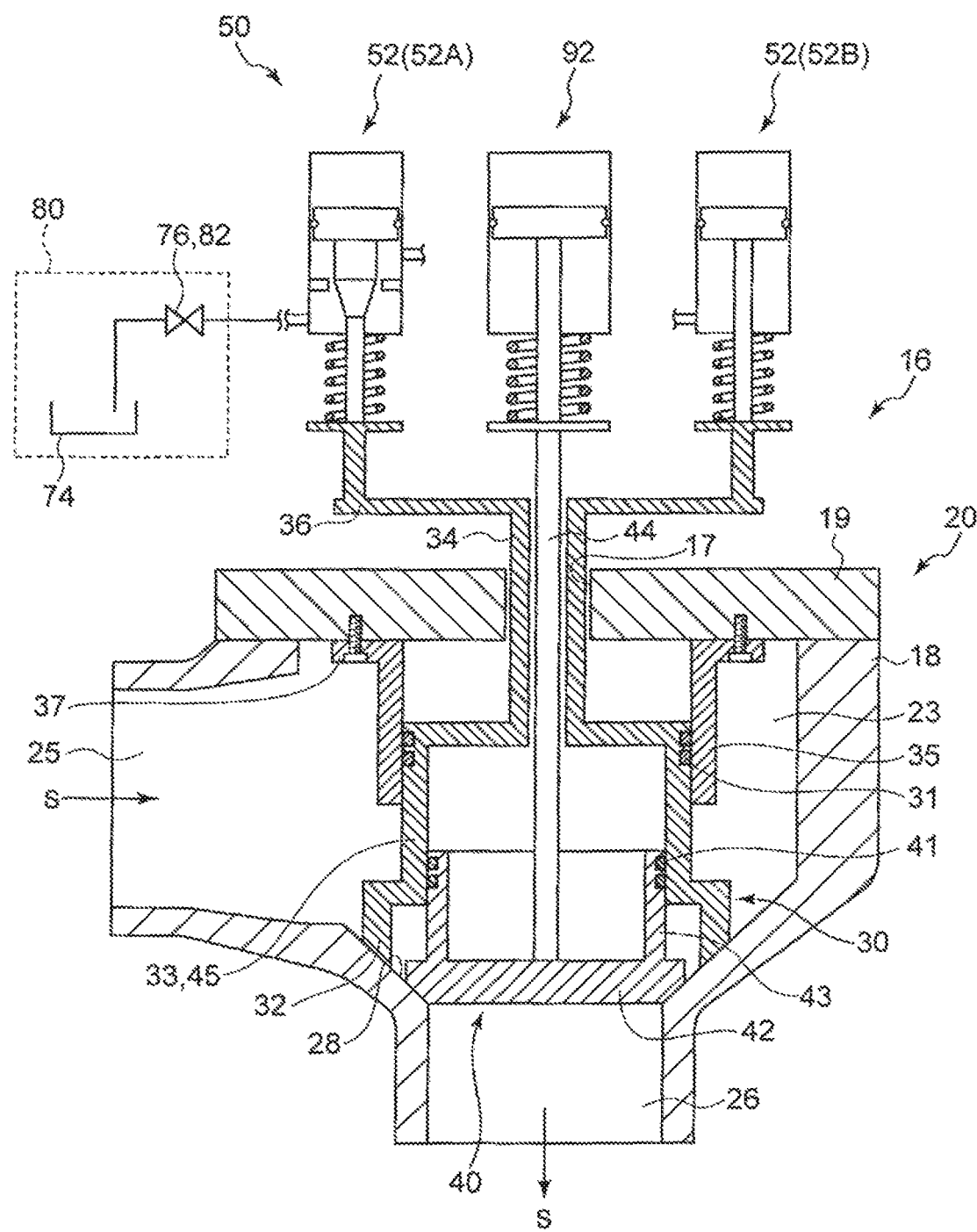
FIG. 2 is a longitudinal cross-sectional view of the steam valve according to one embodiment, illustrating a schematic configuration of the hydraulic driving device according to one embodiment.

Next, a steam valve employing the hydraulic driving device according to one embodiment is described in detail with reference to FIG. 2. FIG. 2 is a longitudinal cross-sectional view of the steam valve according to one embodiment, illustrating a schematic configuration of the hydraulic driving device according to one embodiment.

This steam valve 16 illustrated in FIG. 2 is a combined steam valve in which a stop valve 30 for shutting off the flow of steam and a regulating valve 40 for adjusting the flowrate of the steam are combined.

The steam valve 16 has a valve case 20 including a case main body 18 and a lid portion 19. A valve body (stop valve body) 32 of the stop valve 30 and a valve body (regulating valve body) 42 of the regulating valve are accommodated in a valve chamber 23 defined by the case main body 18 and the lid portion 19. FIG. 2 is a diagram illustrating a state where the stop valve 30 and the regulating valve 40, forming the steam valve 16, are closed.

An inlet 25 and an outlet 26 are formed on the valve case 20, and are respectively in communication with an upstream side and a downstream side of the main steam supply piping 3 (see FIG. 1). The steam (denoted with a reference numeral S), supplied from the boiler 2 through the main steam supply piping 3, flows into the steam valve 16 through the inlet 25, and is supplied to the steam turbine 4 (see FIG. 1) on the downstream side, through the outlet 26.

The stop valve body 32 and the regulating valve body 42 are disposed between the inlet 25 and the outlet 26 in the valve chamber 23, and are seated on a valve seat 28 formed by the valve case 20. When the stop valve 30 or the regulating valve 40 is drivingly opened/closed, the flow of steam from the inlet 25 to the outlet 26 is shut off or the flowrate of the steam is adjusted.

The stop valve 30 includes: a stop valve body 32; and a stop valve shaft 34 for driving the stop valve body 32. The stop valve shaft 34 extends to the outside of the valve case 20 through a through hole 17 formed in the lid portion 19 of the valve case 20, and is connected to a hydraulic driving device 50 via the connection member 36, outside the valve case 20. The hydraulic driving device 50 includes a plurality of hydraulic actuators 52. Driving force generated by the plurality of hydraulic actuators 52 is transmitted to the stop valve body 32 via the stop valve shaft 34. The stop valve body 32 is driven, together with the stop valve shaft 34, along an axial direction of the stop valve shaft 34 to be opened/closed. When the stop valve 30 is closed by using the hydraulic driving device 50, the flow of steam from the inlet 25 to the outlet 26 is shut off. The stop valve shaft 34 has a hollow structure, and has a center hollow portion in which a regulating valve shaft 44 described below is inserted.

The stop valve body 32 may include a cylindrical portion 33 having a cylindrical shape. The stop valve 30 may be driven to be opened/closed with the cylindrical portion 33 guided, along the axial direction of the stop valve shaft 34, by a guide portion 35 in the valve chamber 23. The guide portion 35 is coaxially provided with the cylindrical portion 33, on an outer circumferential side of the cylindrical portion 33. An O ring 31 may be attached on an outer circumference surface of the cylindrical portion 33, to prevent the steam from leaking out through a space between the cylindrical portion 33 and the guide portion 35. The guide portion 35 may include a flange portion 37 to be fixed to the lid portion 19 with the flange portion 37 fastened by a fastening member such as a bolt.

The regulating valve 40 includes: the regulating valve body 42; and the regulating valve shaft 44 for driving the regulating valve body 42. The regulating valve shaft 44 extends to the outside of the valve case 20 along the axial direction of the stop valve shaft 34, through the through hole 17 formed in the lid portion 19 of the valve case 20 and the hollow portion of the stop valve shaft 34. Thus, the regulating valve shaft 44 is connected to a hydraulic actuator 92 outside the valve case 20. Driving force generated by the hydraulic actuator 92 is transmitted to the regulating valve body 42 via the regulating valve shaft 44. The regulating valve body 42 is driven together with the regulating valve shaft 44 along the axial direction of the regulating valve shaft 44 to be opened/closed. When the opening of the regulating valve 40 is adjusted by using the hydraulic actuator 92, the steam with flowrate corresponding to the opening flows into the steam turbine 4, to drive the steam turbine. The amount of steam flowing into the steam turbine 4 is controlled by adjusting the opening of the regulating valve 40 in accordance with a load on the steam turbine 4.

The regulating valve body 42 may include a cylindrical portion 43 having a cylindrical shape. The regulating valve 40 may be driven to be opened/closed with the cylindrical portion 43 guided, along the axial direction of the regulating valve shaft 44, by a guide portion 45 in the valve chamber 23. The guide portion 45 is coaxially provided with the cylindrical portion 43, on an outer circumferential side of the cylindrical portion 43. An O ring 41 may be attached on an outer circumference surface of the cylindrical portion 43, to prevent the steam from leaking out through a space between the cylindrical portion 43 and the guide portion 45. In the embodiment illustrated in FIG. 2, the cylindrical portion 33 of the stop valve body 32 functions as the guide portion 45 for guiding the cylindrical portion 43 of the regulating valve 40. In another embodiment, the guide portion 45, provided separately from the cylindrical portion 33 of the stop valve body 32, may be provide on the outer circumferential side of the cylindrical portion 43 of the regulating valve body 42.

Figure 3:
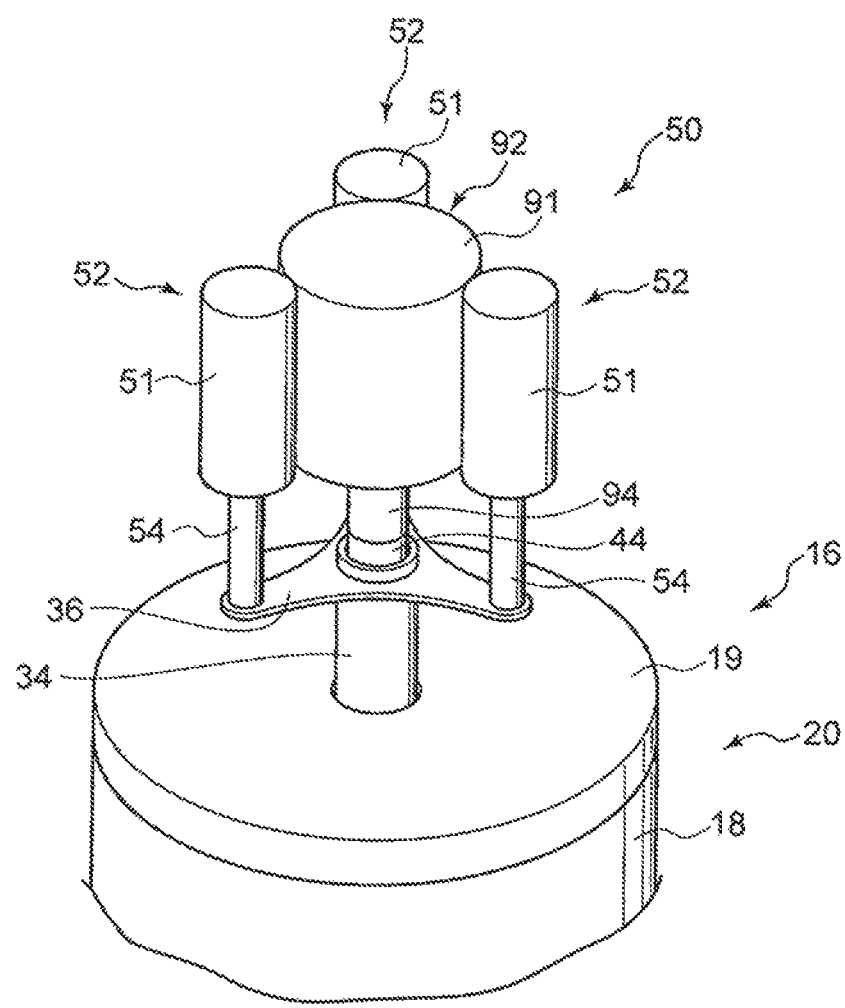
FIG. 3 is a perspective view illustrating an outer appearance of the steam valve and the hydraulic driving device illustrated in FIG. 2.
Figure 4:
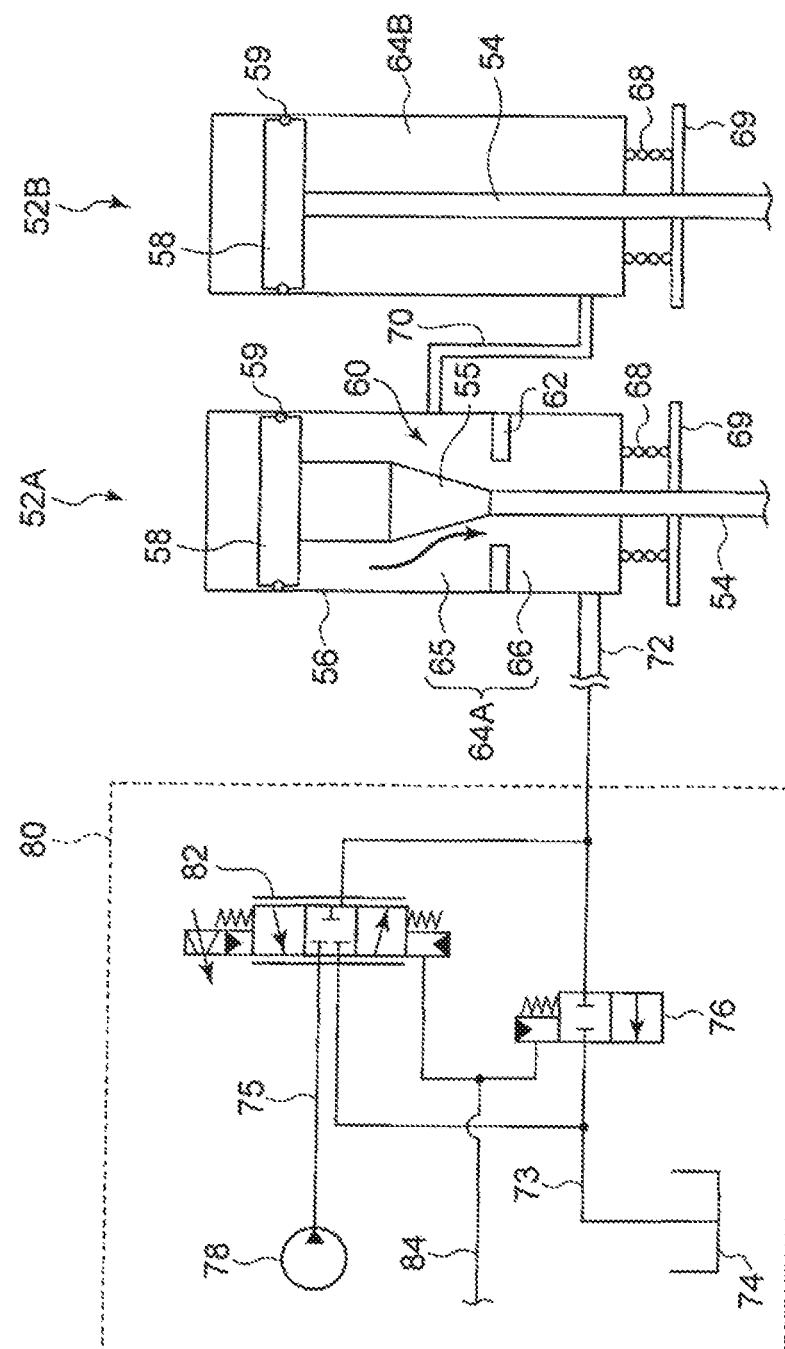
FIG. 4 is a diagram schematically illustrating a configuration of a hydraulic actuator and an external hydraulic circuit according to one embodiment.

Next, a hydraulic driving device according to some embodiments is described with reference to FIG. 2 to FIG. 8. FIG. 3 is a perspective view illustrating an outer appearance of the steam valve and the hydraulic driving device illustrated in FIG. 2. FIG. 4 is a diagram schematically illustrating a configuration of a hydraulic actuator and an external hydraulic circuit according to one embodiment. FIG. 5 to FIG. 8 are each a diagram schematically illustrating a hydraulic driving device according to one embodiment.

As illustrated in FIG. 2, the hydraulic driving device for a steam valve according to one embodiment is a hydraulic driving device 50 for driving the stop valve body 32 of the steam valve 16.

As illustrated in FIG. 2 and FIG. 3, the hydraulic driving device 50 includes a plurality of (three in this example) of hydraulic actuators 52. Components of the hydraulic actuator 52, such as a cylinder and a piston, may be accommodated in the casing 51 illustrated in FIG. 3. The casing 51 is omitted in the figures other than FIG. 3. Each rod 54 as an output shaft of a corresponding one of the hydraulic actuators 52 is connected to the stop valve shaft 34 via the connection member 36. In each hydraulic actuator 52, the driving force to be transmitted to the stop valve body 32 is generated, and the driving force thus generated is output, via each rod 54, to be transmitted to the stop valve body 32 via the connection member 36 and the stop valve shaft 34.

In one embodiment, as illustrated in FIG. 3, the plurality of hydraulic actuators 52, forming the hydraulic driving device 50 for driving the stop valve body 32, are arranged at equal intervals circumferentially around a hydraulic actuator 92 for driving the regulating valve body 42. Components of the hydraulic actuator 92 may be accommodated in a casing 91.

The plurality of hydraulic actuators 52 are connected to each other via communication pipes that are described later, and will be omitted in FIG. 3 to simplify the illustration.

The plurality of hydraulic actuators 52 of the hydraulic driving device 50 include: a main actuator 52A provided with a throttle portion 60 described later; and at least one sub actuator 52B provided with no throttle portion 60.

As illustrated in FIG. 4, the hydraulic actuators 52 (52A, 52B), including the main actuator 52A and the sub actuator 52B, each include: a cylinder 56; a piston 58 configured to be capable of reciprocating in the cylinder 56; and the rod 54. The rod 54 has one end connected to the piston 58 and the other end connected to the stop valve shaft 34. Pressure oil is supplied to a hydraulic chamber 64 (a hydraulic chamber 64A of the main actuator 52A and a hydraulic chamber 64B of the sub actuator 52B) defined by the cylinder 56 and the piston 58. Thus, the piston 58 moves in the cylinder 56 in accordance with the pressure of the pressure oil. An O ring 59 may be attached to an outer circumference surface of the piston 58 to achieve sealing for preventing the pressure oil from leaking outside the hydraulic chamber.

The hydraulic actuator 52 (52A, 52B) includes a spring 68 and a support plate 69 that is attached to the rod 54. The spring 68 is supported between the support plate 69 and the cylinder 56. Urging force of the spring 68 acts on the support plate 69 and the cylinder 56.

In such a hydraulic actuator 52 (52A, 52B), the pressure oil is supplied into the hydraulic chamber 64 (64A, 64B). Thus, when the pressure in the hydraulic chamber 64 (64A, 64B) rises, the piston is pushed by the pressure oil in a valve open direction which is a direction for moving away from the valve body.

When the pressure in the hydraulic chamber 64 (64A, 64B) drops with the pressure oil discharged from the hydraulic chamber 64, the piston moves in a valve close direction which is a direction toward the valve body.

The hydraulic chamber 64A of the main actuator 52A is connected to an external hydraulic circuit 80 including: a pressure oil source 78 for supplying the pressure oil to the hydraulic chamber 64A; and an oil tank 74 storing therein the pressure oil discharged from the hydraulic chamber 64A. The pressure oil source 78 is configured to supply the pressure oil to the hydraulic chamber 64A of the main actuator 52A, for applying hydraulic pressure, toward the valve open direction for the stop valve 30, to the piston 58 of the main actuator 52A. A discharge pipe 72 is connected to the hydraulic chamber 64 of the main actuator 52A, so that the pressure oil in the hydraulic chamber 64A can be discharged to the oil tank through the discharge pipe 72.

As described above, the external hydraulic circuit 80 connected to the hydraulic chamber 64A of the main actuator 52A includes: the pressure oil source 78 for supplying the pressure oil to the hydraulic chamber 64A; and the oil tank 74 storing therein the pressure oil discharged from the hydraulic chamber 64A. In one embodiment, the external hydraulic circuit 80 further includes a pressure control valve 82 and an emergency valve 76. The pressure control valve 82 is disposed at a position on a supply line 75, establishing connection between the hydraulic chamber 64A and the pressure oil source 78, and on a discharge line 73, establishing connection between the hydraulic chamber 64A and the oil tank 74. The emergency valve 76 is disposed in parallel with the pressure control valve 82 on the discharge line 73.

To achieve an open state of the stop valve 30, the pressure oil is supplied from the pressure oil source 78 to the hydraulic chamber 64A via the pressure control valve 82. The pressure of the pressure oil, supplied from the pressure oil source 78 to the hydraulic chamber 64A, is controlled with the pressure control valve 82. The stop valve 30 is opened/closed via the stop valve shaft 34 in accordance with the pressure as a result of the control.

To achieve a closed state of the stop valve 30, the pressure control valve 82 is operated by hydraulic oil from the pressure oil source 78. Then, the oil is discharged from the hydraulic chamber 64A to the oil tank 74 through the pressure control valve 82 and the discharge line 73. Thus, the pressure in the hydraulic chamber 64A drops.

In one embodiment, the external hydraulic circuit 80 includes a tripping line 84 connected to the pressure control valve 82 and the emergency valve 76. When the steam turbine 4 is tripped, for purposes such as an emergency stop of the steam turbine 4, the hydraulic oil is supplied to a pilot port of the pressure control valve 82 from the tripping line 84. Thus, the pressure control valve 82 is operated in such a manner that the pressure oil in the hydraulic chamber 64A is discharged to the oil tank 74 through a port of the pressure control valve 82 on the side of the discharge line 73. Thus, the stop valve 30 is closed with the pressure in the hydraulic chamber 64A dropped. When the steam turbine 4 is tripped, the hydraulic oil is supplied to the pilot port of the emergency valve 76 from the tripping line 84. Thus, the emergency valve 76 is operated to achieve a valve opened state. Then, the pressure oil in the hydraulic chamber 64A is discharged to the oil tank 74 via the emergency valve 76, whereby the stop valve 30 is closed with the pressure in the hydraulic chamber 64A dropped. With the emergency valve 76 described above provided, even when the pressure control valve 82 does not properly operate due to failure or the like, the tripping can be performed with the discharging of the pressure oil in the hydraulic chamber 64A to the oil tank 74 guaranteed for closing the stop valve 30.

In the main actuator 52A, the rod 54 has a truncated cone portion 55 with a diameter increasing along the axial direction of the cylinder 56 toward the piston 58. The main actuator 52A is provided with a flange portion 62 extending inward in a radial direction of the cylinder 56 from an inner wall of the cylinder 56. A throttle portion 60 is formed between the truncated cone portion 55 of the rod 54 and the flange portion 62. When the piston 58 moves in the valve close direction, a flow path opening area of the throttle portion 60 formed by the truncated cone portion 55 and the flange portion 62 gradually reduces. Thus, in a closing operation of the stop valve body 32, the flow path is throttled by the throttle portion as the valve body moves in the valve close direction. Thus, the pressure in the hydraulic chamber 64A rises with the flow of the pressure oil restricted. An arrow in FIG. 4 indicates a flow of the pressure oil in this process.

As described above, the flow of the pressure oil in the hydraulic chamber 64A is restricted by the throttle portion 60 as the piston 58 moves in the valve close direction. Thus, in the closing operation of the stop valve body 32, damping force acts on the stop valve body 32. Thus, when the stop valve 30 closes, the stop valve body 32 is slowed down, around the opening close to the closing (for example, an opening of about 10% to 20%), to be gently seated on the valve seat 28. With such a damper function, the stop valve body 32 and the valve seat 28 can be prevented from abruptly colliding with each other to be damaged.

Unlike the main actuator 52A, the sub actuator 52B has no throttle portion 60. The hydraulic chamber 64B of the sub actuator and the hydraulic chamber 64A of the main actuator 52A are connected to each other through the communication pipe 70 to communicate with each other.

In this configuration, the throttle portion 60 is disposed in the hydraulic chamber 64A of the main actuator 52A. Thus, the pressure in the hydraulic chamber 64A of the main actuator 52A rises as the piston 58 moves in the closing operation of the stop valve 30. Accordingly, the pressure also rises in the hydraulic chamber 64B of the sub actuator 52B communicating with the hydraulic chamber 64A of the main actuator 62A. In this manner, the closing operation of the stop valve 30 involves a pressure rise in the hydraulic chamber 64 of all of the hydraulic actuators 52. Thus, the damping force can be applied to the stop valve body 32 during the closing operation. All things considered, the hydraulic driving device 50 can have a simple structure with the throttle portion 60 disposed in the hydraulic chamber 64A of the main actuator 52A providing the damper function to the hydraulic chamber 64 of all the hydraulic actuators 52.

Since the hydraulic chamber 64B of the sub actuator 52B is communicating with the hydraulic chamber 64A of the main actuator 52A, the hydraulic chambers 64 (64A, 64B) have the same pressure in a normal state. Thus, a uniform damping force can be provided in the plurality of hydraulic actuators 52 (52A, 52B), and the damping force can be applied to a single stop valve body 32.

In one embodiment, the piston 58 of the sub actuator 52B is configured to receive the pressure oil from the pressure oil source 78 via the hydraulic chamber 64A of the main actuator 52A.

In this configuration, the pressure oil is also supplied to the hydraulic chamber 64B of the sub actuator 52B through the hydraulic chamber 64A of the main actuator 52A by the pressure oil source 78 configured to supply the pressure oil to the hydraulic chamber 64A of the main actuator 52A. Thus, the hydraulic driving device 50 can have a simple structure with all the hydraulic actuators 52, including the main actuator 52A and the sub actuator 52B, sharing a single pressure oil source.

In one embodiment, as illustrated in FIG. 4, the hydraulic chamber 64A of the main actuator 52A includes: a first chamber 65 facing the piston 58; and a second chamber 66 communicating with the first chamber 65 via the throttle portion 60. The second chamber 66 is connected to the external hydraulic circuit 80 including the oil tank 74. The hydraulic chamber 64B of the sub actuator 52B communicates with the first chamber 65 of the hydraulic chamber 64A of the main actuator 52A.

In the main actuator 52A, the flow of the hydraulic oil from the first chamber 65 to the second chamber 66 is throttled, in the closing operation of the stop valve 30, by the throttle portion 60 between the first chamber 65 and the second chamber 66. Thus, the pressure rises in the first chamber 65, whereby the damping force is applied to the stop valve body 32. The hydraulic chamber 64B of the sub actuator 52B communicates with the first chamber 65 of the main actuator 52A. Thus, in the closing operation of the stop valve 30, the pressure rise in the first chamber 65 of the main actuator 52A entails the pressure rise in the hydraulic chamber 64B of the sub actuator 52B. Thus, the throttle portion 60 provided to the hydraulic chamber 64A of the main actuator 52A can achieve a uniform damping force on the plurality of hydraulic actuators 52 including the main actuator 52A and the sub actuator 52B, and the damping force can be applied to a single stop valve body 32.

Figure 5:
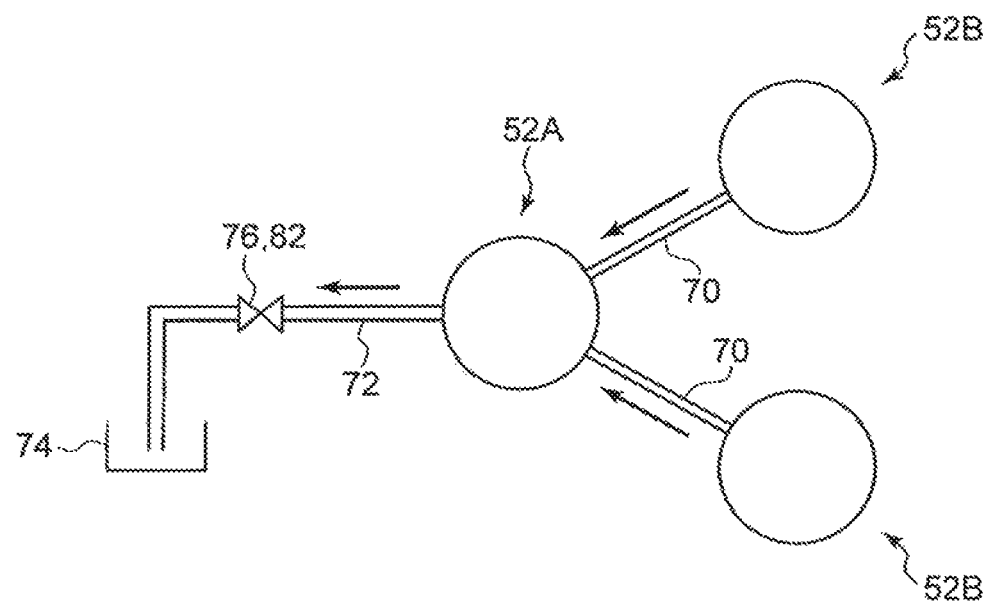
FIG. 5 is a diagram schematically illustrating a hydraulic driving device according to one embodiment.
Figure 6:
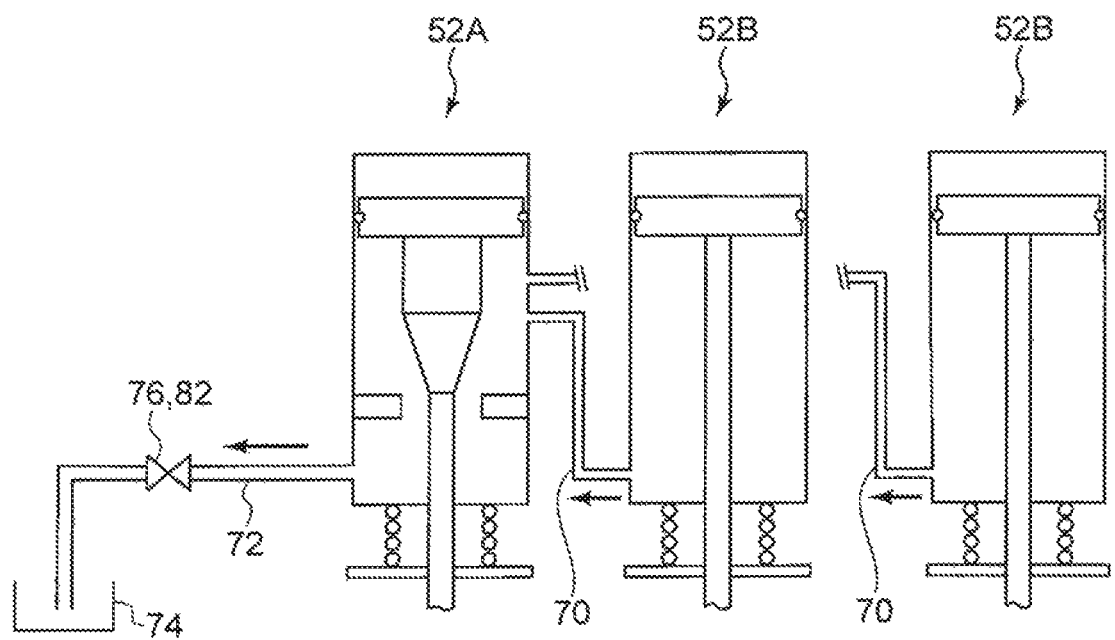
FIG. 6 is a diagram schematically illustrating a hydraulic driving device according to one embodiment.
Figure 7:
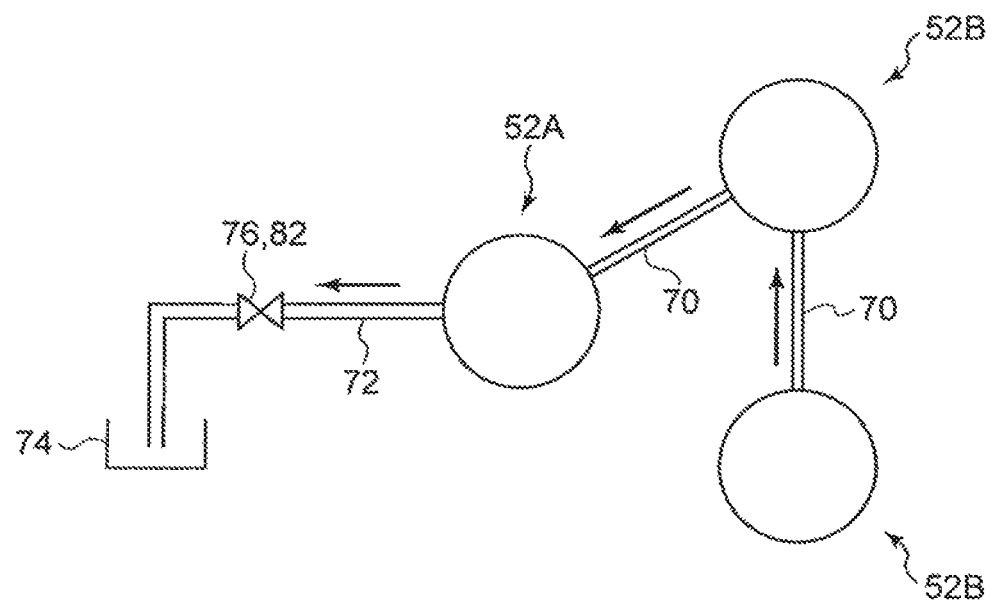
FIG. 7 is a diagram schematically illustrating a hydraulic driving device according to one embodiment.
Figure 8:
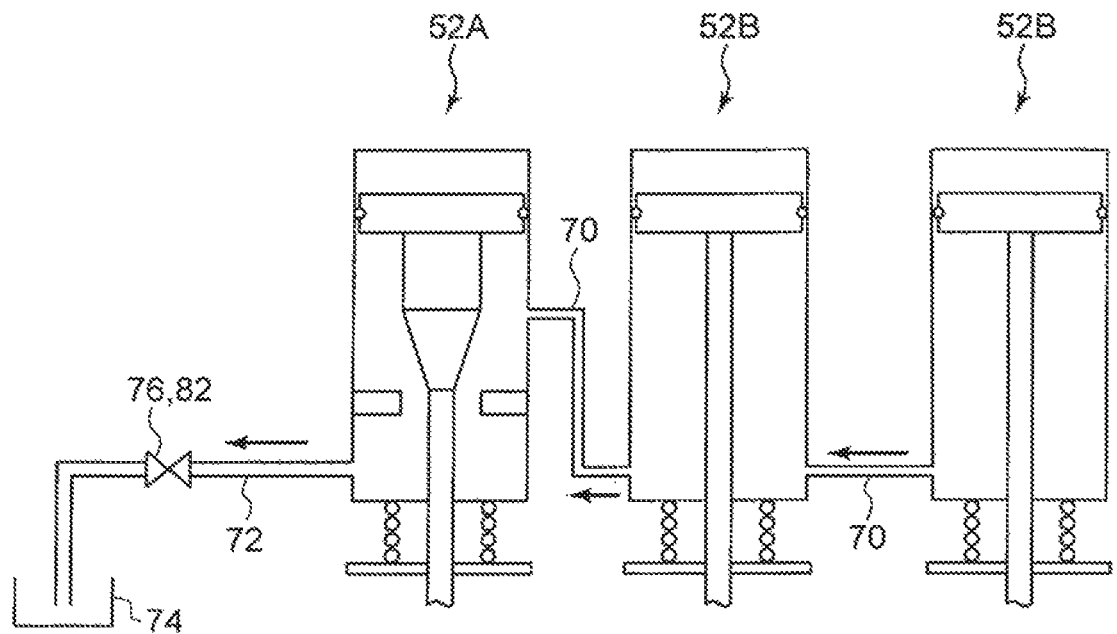
FIG. 8 is a diagram schematically illustrating a hydraulic driving device according to one embodiment.

A connection mode of the plurality of hydraulic actuators 52 according to some embodiments are described. FIG. 5 and FIG. 6, as well as FIG. 7 and FIG. 8 illustrate the connection mode of the plurality of hydraulic actuators 52 of the hydraulic driving device 50 according to a single embodiment. FIG. 5 and FIG. 7 are upper views of the plurality of hydraulic actuators 52, whereas FIG. 6 and FIG. 8 are side views of the plurality of hydraulic actuators.

In one embodiment, as illustrated in FIG. 5 and FIG. 6, the hydraulic chamber 64A of the main actuator 52A is connected to the hydraulic chamber 64B of each of the sub actuators 52B (two sub actuators 52B in FIG. 5 and FIG. 6) through a communication pipe 70. More specifically, the first chamber 65 of the hydraulic chamber 64A of the main actuator 52A is connected to the hydraulic chamber 64B of each of the sub actuators 52B through the communication pipe 70.

With the hydraulic chamber 64B of each of the sub actuators 52B and the hydraulic chamber 64A of the main actuator 52A directly connected to each other via the communication pipe as described above, the pressure in each sub actuator 52B immediately changes in accordance with the pressure change in the hydraulic chamber 64A of the main actuator 52A. Thus, the throttle portion 60, provided to the hydraulic chamber 64A of the main actuator 52A, achieves uniform damping force in the plurality of hydraulic actuators 52 (52A, 52B), and the damping force can be applied to the single stop valve body 32.

In one embodiment, as illustrated in FIG. 7 and FIG. 8, the hydraulic chambers 64B of two or more sub actuators 52B (two sub actuators 52B in FIG. 7 and FIG. 8) are connected in series with the hydraulic chamber 64A of the main actuator 52A through the communication pipe 70. More specifically, the hydraulic chambers 64B of the two or more sub actuators 52B are connected in series with the hydraulic chamber 64A of the main actuator 52A. Thus, when the number of sub actuators 52B is two as illustrated in FIG. 7 and FIG. 8, the hydraulic chamber 64B of one of the sub actuators 52B is connected to the hydraulic chamber 64A of the main actuator 52A. The hydraulic chamber 64B of the other one of the sub actuators 52B is connected to the hydraulic chamber 64B of the one sub actuator 52B.

With the hydraulic chambers 64B of the plurality of sub actuators 52B connected in series with the hydraulic chamber 64A of the main actuator 52A as described above, the hydraulic actuators 52 (52A, 52B) close to each other can be connected with each other. Thus, the hydraulic driving device 50 can be easily installed and built.

In one embodiment, the discharge pipe 72, through which the pressure oil in the hydraulic chamber 64A of the main actuator 52A is discharged to the oil tank 74, has a larger diameter than the communication pipe 70 establishing connection between the hydraulic chambers 64 (64A, 64B) of the hydraulic actuators 52 (52A, 52B). For example, the diameter of the discharge pipe 72 may be twice as large as that of the communication pipe 70 or may be even larger.

When the diameter of the discharge pipe 72 is equal to or smaller than the diameter of the communication pipe 70, a sufficient flowrate of the pressure oil in the discharge pipe 72 cannot be guaranteed and the discharge of the pressure oil can be disrupted while the stop valve body 32 is closed, and thus quick valve closing might be unachievable. In this regard, when the discharge pipe 72 has a larger diameter than the communication pipe 70, the pressure oil in the hydraulic chambers 64 (64A, 64B) of the hydraulic actuators 52 (52A, 52B) can be smoothly discharged through the discharge pipe 72, whereby the stop valve body 32 can be quickly moved in the valve close direction.

The present invention is not limited to the embodiment described above, and includes a mode obtained by modifying the embodiment described above and a mode obtained by appropriately combining the modes.

For example, in the example described in the embodiment described above, the stop valve 30 is driven by the hydraulic driving device 50 including the plurality of hydraulic actuators 52. In other embodiments, the regulating valve 40 may be driven by the hydraulic driving device 50 including the plurality of hydraulic actuators 52.

In such a configuration, the regulating valve body 42 may be positioned on an outer circumference side of the stop valve body 32, the regulating valve shaft 44 may be connected to the plurality of hydraulic actuators 52 via the connection member 36, and the stop valve shaft 34 may be extend to the outside of the valve case 20 through the hollow portion of the regulating valve shaft 44 to be connected to the hydraulic actuator 92 outside of the valve case 20.

The expressions used herein that mean relative or absolute arrangement, such as "in a direction", "along a direction", in parallel with", "orthogonal with", "center", "concentrically", and "coaxial" mean not only exactly what they refer to but also such states that are relatively displaced with a tolerance or by an angle or distance that is small enough to achieve the same level of functionality.

For example, the expressions used herein that mean things are equivalent to each other, such as "the same", "equivalent", and "uniform", mean not only exactly equivalent states but also such states that have a tolerance or a difference that is small enough to achieve the same level of functionality.

For example, expressions that represent shapes, such as quadrangles and cylindrical shapes, mean not only what they refer to in a geometrically strict sense but also shapes having some irregularities, chamfered portions, or the like that can provide the same level of functionality.

The expressions "including", "comprising", and "provided with" one component are not exclusive expressions that exclude other components.

REFERENCE SIGNS LIST

1 Power generating system
2 Boiler
3 Main steam supply piping
4 Steam turbine
6 Generator
8 High pressure steam turbine
10 Medium pressure steam turbine
12 Low pressure steam turbine
14 Reheater
16 Steam valve
17 Through hole
18 Case main body
19 Lid portion 20 Valve case
22 Stop valve
23 Valve chamber
24 Regulating valve
25 Inlet
26 Outlet
28 Valve seat
30 Stop valve
31 O ring
32 Stop valve body
33 Cylindrical portion
34 Stop valve shaft
35 Guide portion
36 Connection member
37 Flange portion
40 Regulating valve
41 O ring
42 Regulating valve body
43 Cylindrical portion
44 Regulating valve shaft
45 Guide portion
50 Hydraulic driving device
51 Casing
52 Hydraulic actuator
52A Main actuator
52B Sub actuator
54 Rod
55 Truncated cone portion
56 Cylinder
58 Piston
59 O ring
60 Throttle portion
62 Flange portion
62A Main actuator
54 Hydraulic chamber
64A Hydraulic chamber
64B Hydraulic chamber
65 First chamber
66 Second chamber
68 Spring
69 Support plate
70 Communication pipe
72 Discharge pipe
73 Discharge line
74 Oil tank
75 Supply line
76 Emergency valve
78 Pressure oil source
80 External hydraulic circuit
82 Pressure control valve
84 Tripping line
91 Casing
92 Hydraulic actuator

The invention claimed is:

1. A hydraulic driving device for a steam valve for driving a valve body of the steam valve, the hydraulic driving device comprising:
   a plurality of hydraulic actuators to generate driving force to be transmitted to the valve body through a valve shaft of the steam valve, wherein
   the plurality of hydraulic actuators each include:
     a cylinder;
     a piston which is configured to be capable of reciprocating in the cylinder; and
     a rod having one end connected to the piston and another end connected to the valve shaft,
   the plurality of hydraulic actuators include a main actuator including a throttle portion for regulating a flow of pressure oil in a hydraulic chamber defined by the cylinder and the piston so that a damping force is applied to the valve body during a closing operation of the valve body,
   the one or more hydraulic actuators other than the main actuator include at least one sub actuator not having the throttle portion provided,
   a hydraulic chamber of the sub actuator is in communication with the hydraulic chamber of the main actuator, and
   the throttle portion is disposed in the hydraulic chamber of the main actuator, the hydraulic chamber being formed on a rod side of the piston by the piston and the cylinder.

2. The hydraulic driving device for a steam valve according to claim 1, further comprising at least one communication pipe which respectively connects the hydraulic chamber of the at least one sub actuator to the hydraulic chamber of the main actuator.

3. The hydraulic driving device for a steam valve according to claim 1, further comprising:
   at least one communication pipe connecting the hydraulic chambers of the plurality of hydraulic actuators to one another; and
   a discharge pipe through which pressure oil in the hydraulic chamber of the main actuator is to be discharged to an oil tank, wherein
   the discharge pipe has a larger diameter than the communication pipe.

4. The hydraulic driving device for a steam valve according to claim 1, further comprising a pressure oil source configured to supply pressure oil to the hydraulic chamber of the main actuator so that an oil pressure in a valve open direction is applied to the piston, wherein
   the piston of the at least one sub actuator is configured to receive the pressure oil from the pressure oil source via the hydraulic chamber of the main actuator.

5. A combined steam valve, comprising:
   a valve chamber;
   a regulating valve provided in the valve chamber; and
   a stop valve provided in the valve chamber, wherein
   the stop valve is configured to be driven by the hydraulic driving device according to claim 1.

6. A steam turbine, comprising the combined steam valve according to claim 5.

7. A hydraulic driving device for a steam valve for driving a valve body of the steam valve, the hydraulic driving device comprising:
   a plurality of hydraulic actuators to generate driving force to be transmitted to the valve body through a valve shaft of the steam valve, wherein
   the plurality of hydraulic actuators each include:
     a cylinder;
     a piston which is configured to be capable of reciprocating in the cylinder; and
     a rod having one end connected to the piston and another end connected to the valve shaft,
   the plurality of hydraulic actuators include a main actuator including a throttle portion for regulating a flow of pressure oil in a hydraulic chamber defined by the cylinder and the piston so that a damping force is applied to the valve body during a closing operation of the valve body, the one or more hydraulic actuators other than the main actuator include at least one sub actuator not having the throttle portion provided, a hydraulic chamber of the sub actuator is in communication with the hydraulic chamber of the main actuator, the hydraulic chamber of the main actuator includes:
 a first chamber facing the piston; and
 a second chamber which is in communication with the first chamber via the throttle portion and which is connected to an external hydraulic circuit including an oil tank, and the hydraulic chamber of the at least one sub actuator is in communication with the first chamber of the hydraulic chamber of the main actuator.

8. The hydraulic driving device for a steam valve according to claim 7, further comprising at least one communication pipe which respectively connects the hydraulic chamber of the at least one sub actuator to the hydraulic chamber of the main actuator.

9. The hydraulic driving device for a steam valve according to claim 7, wherein the at least one sub actuator includes two or more sub actuators, and the hydraulic chambers of the two or more sub actuators are connected in series with the hydraulic chamber of the main actuator.

10. A hydraulic driving device for a steam valve for driving a valve body of the steam valve, the hydraulic driving device comprising:
 a plurality of hydraulic actuators to generate driving force to be transmitted to the valve body through a valve shaft of the steam valve, wherein
 the plurality of hydraulic actuators each include:
  a cylinder;
  a piston which is configured to be capable of reciprocating in the cylinder; and
  a rod having one end connected to the piston and another end connected to the valve shaft,
 the plurality of hydraulic actuators include a main actuator including a throttle portion for regulating a flow of pressure oil in a hydraulic chamber defined by the cylinder and the piston so that a damping force is applied to the valve body during a closing operation of the valve body,
 the one or more hydraulic actuators other than the main actuator include at least one sub actuator not having the throttle portion provided,
 a hydraulic chamber of the sub actuator is in communication with the hydraulic chamber of the main actuator, and
 the at least one sub actuator includes two or more sub actuators, and the hydraulic chambers of the two or more sub actuators are connected in series with the hydraulic chamber of the main actuator.

* * * * *